US008284636B2

(12) United States Patent
Oumi et al.

(10) Patent No.: US 8,284,636 B2
(45) Date of Patent: Oct. 9, 2012

(54) NEAR-FIELD THERMALLY ASSISTED MAGNETIC RECORDING HEAD AND RECORDING APPARATUS THEREOF

(75) Inventors: Manabu Oumi, Chiba (JP); Masakazu Hirata, Chiba (JP); Majung Park, Chiba (JP)

(73) Assignee: Seiko Instruments Inc. (JP)

( * ) Notice: Subject to any disclaimer, the term of this patent is extended or adjusted under 35 U.S.C. 154(b) by 487 days.

(21) Appl. No.: 12/448,262

(22) PCT Filed: Dec. 10, 2007

(86) PCT No.: PCT/JP2007/073808
§ 371 (c)(1),
(2), (4) Date: Aug. 24, 2009

(87) PCT Pub. No.: WO2008/075582
PCT Pub. Date: Jun. 26, 2008

(65) Prior Publication Data
US 2010/0002550 A1     Jan. 7, 2010

(30) Foreign Application Priority Data
Dec. 18, 2006  (JP) .................. 2006-339601

(51) Int. Cl.
*G11B 11/00* (2006.01)
(52) U.S. Cl. .................. 369/13.33; 369/13.13

(58) Field of Classification Search ............... 369/13.33, 369/13.13, 13.32, 13.02, 112.09, 112.14, 369/112.21, 112.27; 360/59; 395/129, 31, 395/88–94; 250/201.3, 201.5
See application file for complete search history.

(56) References Cited

U.S. PATENT DOCUMENTS

| 6,954,340 | B2 | 10/2005 | Shukh et al. .................. 360/317 |
| 7,821,732 | B2 * | 10/2010 | Komura et al. ............ 369/13.33 |
| 7,936,531 | B2 * | 5/2011 | Tomikawa et al. ......... 369/13.33 |
| 2007/0139818 | A1 * | 6/2007 | Shimazawa et al. ....... 369/13.33 |
| 2010/0061200 | A1 * | 3/2010 | Shimazawa et al. ....... 369/13.33 |

FOREIGN PATENT DOCUMENTS

| JP | 2002184015 | 6/2002 |
| JP | 2004118918 | 4/2004 |

* cited by examiner

Primary Examiner — Tan X Dinh
(74) Attorney, Agent, or Firm — Adams & Wilks

(57) ABSTRACT

A recording head has a conical tip disposed at a distal end thereof configured to oppose a surface of a medium. The conical tip has an opening for generating near-field light and a side surface forming at least a part of an edge portion of the conical tip surrounding the opening. A magnetic recording element generates magnetization inversion in a minute area on the surface of the medium which is heated by application of the near-field light. The magnetic recording element has a main magnetic pole, a secondary magnetic pole, and a dielectric film arranged between the main and secondary magnetic poles. The main magnetic pole comprises a thin film arranged on side surface of the conical tip for providing a magnetic field to the surface of the medium in a substantially vertical direction. The secondary magnetic pole is arranged on a surface of the conical tip opposite to the side surface thereof for absorbing a part of the magnetic field provided from the main magnetic pole.

18 Claims, 6 Drawing Sheets

NEAR-FIELD THERMALLY ASSISTED MAGNETIC RECORDING HEAD AND RECORDING APPARATUS THEREOF

CROSS-REFERENCE TO RELATED APPLICATIONS

This application is a U.S. national stage application of International Application No. PCT/JP2007/073808, filed Dec. 10, 2007, claiming a priority date of Dec. 18, 2006, and published in a non-English language.

TECHNICAL FIELD

The present invention relates to a recording head assisted by near field light having a resolution exceeding a diffraction limited by localizing a light into a minute area and, more specifically, to a magnetic recording head assisted by near field light and realizing an extremely high recording density by using the near field light and a magnetic field, and to a recording apparatus equipped with the magnetic recording head.

BACKGROUND ART

In order to accommodate the fast increase in image and video data in the current information driven society, increase in capacity and reduction in size of a data recording and reproducing apparatus is in progress. In the data recording and reproducing apparatus utilizing light, since the recording density depends on a light wavelength, the increase in density is achieved by utilizing light having a short wavelength. Shortening of the wavelength is limited and realization of recording density which does not depend on the wavelength has been searched for, and a technology including a method to localize light energy to a minute spot exceeding the diffraction limited of the light by utilizing near field light has received attention.

In the data recording and reproducing apparatus utilizing magnetism, in order to magnetize a minute area on a surface of a recording medium separately, a near field light assisted magnetic recording system in which only the minute area is heated by being irradiated with the near field light thereto to lower a coercive force thereof and then is magnetized is considered to be a promising next generation candidate of a recording and reproducing principle.

In a magnetic recording technology, a longitudinal recording system in which recording of data in the recording medium is achieved by magnetizing the minute area in a recording layer in the direction parallel to the surface of the recording medium has been employed in the related art. However, improvement in recording density has been difficult to achieve due to the problem of heat fluctuations. In order to solve this problem, employment of so-called a vertical recording system in which the minute area of the recording layer is magnetized in the vertical direction with respect to the surface of the recording medium has been employed. In this system, since the N-pole and the S-pole can hardly form a loop in the recording layer, it is stable in terms of energy, and has a resistance to heat demagnetization in comparison with the longitudinal recording system. In order to further improve the recording density, a material having a larger coercive force as the recording medium is employed in order to minimize a mutual-effect between adjacent magnetic domains or the heat fluctuations. Therefore, even with the vertical recording system described above, recording of data in the recording medium has been difficult to achieve.

Therefore, a system to magnetically record in the recording medium having a large coercive force by lowering the coercive force by heating the minute area momentary receives attention. This is a system in which an element which serves as a heat source is formed in the vicinity of a magnetic recording element mounted on an air floating slider and magnetization of a medium recording layer is inverted by the magnetic field generated by the magnetic recording element while heating the surface of the recording medium by heat irradiated from the heat source. Since the coercive force of the recording layer is large, the area which is magnetized once may exist stably with respect to the heat fluctuations when the temperature is lowered even when it is in the proximity of the next area. This is referred to as a heat assisted magnetic recording system. Important factors for increasing the recording density in the heat assisted magnetic recording system are to divide the area heated for assisting into minute areas, and to heat only areas in which recording is desired. As a method being able to switch ON and OFF at a high frequency and apply heat only an area of several to several tens nm, the above-described near field light may be utilized. This is referred to as the near field light assisted magnetic recording system. Reduction of areas of magnetic poles which generate the magnetic field is also important, and it is necessary to magnetize only the minute area in the heated area.

A head of the near field light assisted magnetic recording system has a structure having a near field light generating element adjacently to a recording magnetic pole of a magnetic head in the related art. The near field light generating element is a scatterer formed of, for example, a thin film metal, and generates a near field light in the minute area by being irradiated with a light from a laser (JP-A-2004-158067, (pp. 5-6, FIG. 1)).

A structure in which a metal thin film having a bow-tie shape (a shape having two triangle arranged with respective apexes oppose to each other) is formed on a bottom surface of the head, and a near field light is generated in a minute gap between the apexes of the triangles at a center of the bow-tie by irradiating the bow-tie with a light vertically from above, so that the near field light is generated superimposingly in an area having the strong magnetic field is also proposed. In the near field light assisted magnetic recording head, the near field light generating element is a bow-tie shaped plane metal film formed on the bottom surface of the head, and the light from the laser is introduced by an optical fiber or the like and reflected by a mirror to apply on the bow-tie, so that the near field light is generated in the gap at the center of the bow-tie. In addition, since the bow-tie serves also as the magnetic recording element, a medium surface area which is heated by the near field light matches the area to be magnetized by the magnetic field. Accordingly, dividing the minute spot by the near field light into the minimal area to the limit is enabled, which is suitable for high-density recording (JP-A-2002-298302 (pp. 4-6, FIG. 1)).

[Patent Document 1] JP-A-2004-158067
[Patent Document 2] JP-A-2002-298302

However, in the near field light assisted magnetic recording head in the structure in the related art, since the near field light generating element is formed adjacently to the magnetic recording element, and is configured in such a manner that an incident light from the laser is applied obliquely from the front of the head, the near field light generating element is arranged outside the magnetic recording element, that is, on an end side of the slider. An air floating head is configured to float obliquely with an air inflow end (leading edge) floating by a larger floating amount than an outflow end (trailing edge), and the magnetic recording element is needed to be brought into proximity to the surface of the recording medium to the maximum for the high-density recording. Therefore, it is mounted near the outflow end. Since the near field light generating element is located outside thereof, it is arranged always behind the magnetic recording element in terms of the scanning direction of the head when viewed from the medium as a result (Patent Document 1, FIGS. 1 to 4). In the near field light assisted magnetic recording for recording by the magnetic recording element after having heated the minute area on the surface of the medium by the near field light, the near field light generating element is preferably arranged in front of the magnetic recording element.

In the related art, since the near field light generating element is arranged behind the magnetic recording element, the area to be heated by the near field light is inevitably a wide area not only an area immediately below the near field light generating element, but also including the front thereof. Therefore, there is a problem such that a minute spot performance which the near field light generating element originally has cannot be demonstrated sufficiently. Also, in the near field light assisted magnetic recording head having the structure in the related art, incoming of the light into the near field light generating element is an air propagation from the laser, so that there is a difficulty in downsizing and simplification of an optically system.

Another near field light assisted magnetic recording head having the structure in the related art includes the bow-tie for generating both the near field light and the magnetic field formed of the plane film formed on the bottom surface of the head, the generated magnetic field is wide spread over the bow-tie. Although the gap at the center of the bow-tie defines the recording density in the case of the longitudinal recording system, the size of a portion of a main magnetic pole opposing the medium defines the recording density in the case of the vertical recording. When the bow-tie is viewed from the side of the recording medium, since the main magnetic pole corresponds to the entire portion of one side of the bow-tie, it is necessary to make the bow-tie by itself to be minute in order to increase the recording density. When the size of the bow-tie is reduced, a periphery of the bow-tie is included in an incident light spot, and the near field light is generated not only at a center portion of the bow-tie, but also in the periphery thereof, so that an erroneous recording may be resulted in the periphery of the bow-tie. In this manner, the head having a structure in which a strong recording magnetic field is generated only at the center portion of the bow-tie where the near field light exists locally is needed.

In view of such points, it is an object of the present invention to provide a near field light assisted magnetic recording head in which wide-spreading of a near field light and a magnetic field is restrained so that a writing reliability is improved, and a recording apparatus using the same.

SUMMARY OF THE INVENTION

In order to solve the above-described problem, a first feature of the present invention is a magnetic recording head assisted by near field light (hereinafter near field light assisted magnetic recording head) having a conical tip configured to generate a near field light at a distal end thereof and a magnetic recording element configured to cause a flux reversal in a minute area on a surface of a medium heated by the near field light by providing the minute area with a magnetic field, characterized in that the magnetic recording element includes a main magnetic pole configured to provide the surface of the medium with the magnetic field substantially in the vertical direction, a secondary magnetic pole configured to absorb a part of the magnetic field provided from the main magnetic pole, and a dielectric film arranged between the main magnetic pole and the secondary magnetic pole, the conical tip includes an opening configured to generate the near field light at the distal end opposing the surface of the medium, and the main magnetic pole constitutes at least part of an edge portion surrounding the opening.

A second feature of the present invention is characterized in that the conical tip includes a first side surface which constitutes at least part of the edge portion surrounding the opening, the main magnetic pole includes a first thin film arranged on the first side surface, the secondary magnetic pole is arranged on an opposite side from the side where the first side surface is arranged from both sides of the first thin film, and the dielectric film is arranged between the first thin film and the secondary magnetic pole.

A third feature of the present invention is characterized in that the dielectric film covers the first thin film and all the side surfaces of the conical tip other than the first side surface from the side surfaces of the conical tip, and the secondary magnetic pole surrounds an entire circumference of the side surface on the opposite side from the side where the first thin film is arranged from the both sides of the dielectric film.

A fourth feature of the present invention is characterized in that the conical tip is formed by applying an etching work on a plane substrate.

A fifth feature of the present invention includes an air floating surface configured to receive an air floating force from the surface of the medium and the air floating surface is at the same level as the conical tip.

A sixth feature of the present invention includes a magnetic resistance element configured to reproduce data recorded on the surface of the medium, and the magnetic resistance element has a conical shape.

A seventh feature of the present invention is characterized in that the conical tip, the air floating surface, and the magnetic resistance element are at the same level.

An eighth feature of the present invention is characterized in that the plane substrate is transparent, and the conical tip generates the near field light by a light incoming into the conical tip from the opposite side from the side where the medium is arranged from the both sides of the conical tip.

A ninth feature of the present invention is a recording apparatus including an air floating head which floats to a predetermined height from the surface of the medium by a balance between an air floating force from the surface of the rotating medium and a load from a suspension arm which supports the conical tip, characterized in that the air floating head is a near field light assisted magnetic recording head according to any one of the descriptions given above.

DETAILED DESCRIPTION OF THE PREFERRED EMBODIMENT (First Embodiment)

Figure 1:
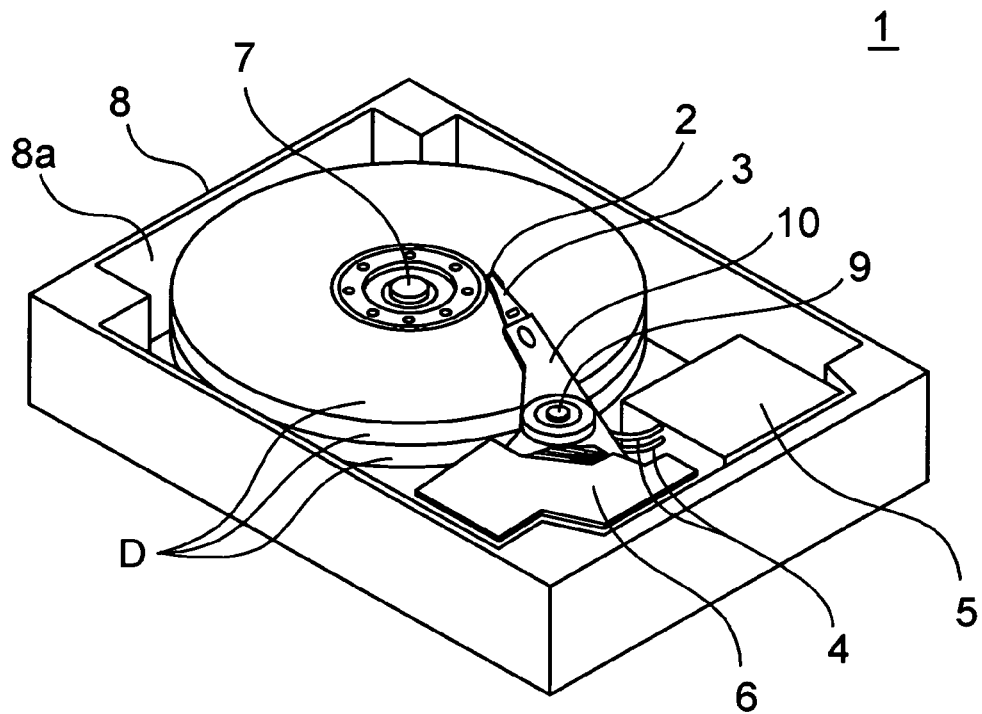
FIG. 1 is a schematic drawing of a data recording apparatus in which a near field light assisted magnetic recording head according to a first embodiment is employed.

Referring now to FIG. 1 to FIG. 7, a first embodiment of a magnetic recording head assisted by near field light (hereinafter near field light assisted magnetic recording head) and a recording apparatus thereof according to the present invention will be described. A recording apparatus 1 in this embodiment includes, as shown in FIG. 1, a near field light assisted magnetic recording head 2, a suspension arm 3 configured to be movable in a direction which is parallel to the surface of a disc D (a surface of a magnetic recording medium) and to support the near field light assisted magnetic recording head 2 at a distal end side in a state of rotatable about two axes (X axis and Y axis) extending in parallel with the surface of the disc D and being orthogonal to each other, an optical signal controller (light source) 5 configured to allow a luminous flux to enter from a proximal end side of a light guide 4 into the light guide 4, an actuator 6 configured to support the proximal end side of the suspension arm 3 and move the suspension arm 3 in a XY direction extending in parallel to the surface of the disc D for scanning, a spindle motor (rotation driving unit) 7 configured to rotate the disc in a constant direction, a control unit (not shown) configured to supply an electric current modulated according to data to the near field light assisted magnetic recording head 2 and control an operation of the optical signal controller 5, and a housing 8 configured to store these components respectively in the interior thereof.

The housing 8 is formed of a metallic material such as aluminum into a square shape in top view, and is formed with a recessed portion 8a for storing respective components in the inside thereof. The housing 8 is configured in such a manner that a lid, not shown, is detachably fixed so as to close an opening of the recessed portion 8a. The spindle motor 7 is attached to a substantially center of the recessed portion 8a, and the disc D is detachably fixed by fitting a center hole on the spindle motor 7. The actuator 6 is attached to a corner portion of the recessed portion 8a. A carriage 10 is mounted to the actuator 6 via a bearing 9, and the suspension arm 3 is attached to a distal end of the carriage 10. Then, the carriage 10 and the suspension arm 3 are movable in the XY direction together by an activation of the actuator 6.

The carriage 10 and the suspension arm 3 are configured to retract from above the disc D by the activation of the actuator 6 when the rotation of the disc D is stopped. The optical signal controller 5 is mounted in the recessed portion 8a adjacently to the actuator 6. The control unit is mounted adjacently to the actuator 6. The near field light assisted magnetic recording head 2 generates a near field light from the introduced luminous flux to heat a minute area on the disc D and provides a magnetic field thereto to cause a flux reversal, so that the data is recorded.

Figure 2:
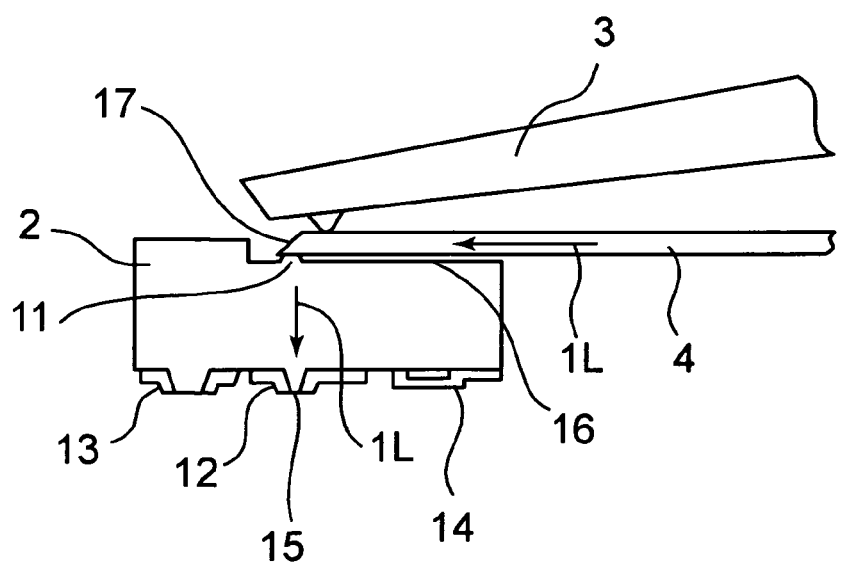
FIG. 2 is a cross-sectional view of the near field light assisted magnetic recording head, a suspension arm, and a light guide according to the first embodiment.

FIG. 2 is a cross-sectional view of the near field light assisted magnetic recording head 2, the suspension arm 3, and the light guide 4 according to this embodiment. The near field light assisted magnetic recording head 2 is formed of a quartz glass substrate having a thickness of 200 ?m, and has a micro lens 11 having a diameter of 80 ?m on an upper surface, a recording element 12, a reproducing element 13, and a magnetic circuit 14 on a bottom surface. The magnetic circuit 14 is magnetically connected to a side surface of the recording element 12 via a portion out of the plane of the cross-sectional view. The detailed description of the bottom surface will be given in conjunction with FIG. 3, and hence it is simplified in FIG. 2. The distal end of the recording element 12 corresponds to both an optical minute opening and to a magnetic minute gap. This portion is referred to as a minute gap 15 (opening). The light guide 4 is fixedly adhered to a guide groove 16 formed on the upper surface of the near field light assisted magnetic recording head 2, and has a distal end which corresponds to a mirror surface 17 ground obliquely. An incident light IL from the light source, not shown, is propagated in the light guide 4, and then, is redirected by being reflected on the mirror surface 17, is condensed by the micro lens 11, and enters the recording element 12. This light becomes the near field light generated from the minute gap 15 at the distal end of the recording element 12. In contrast, the magnetic field generated by the magnetic circuit 14 is propagated to the recording element 12, and is generated from the minute gap 15.

Figure 3:
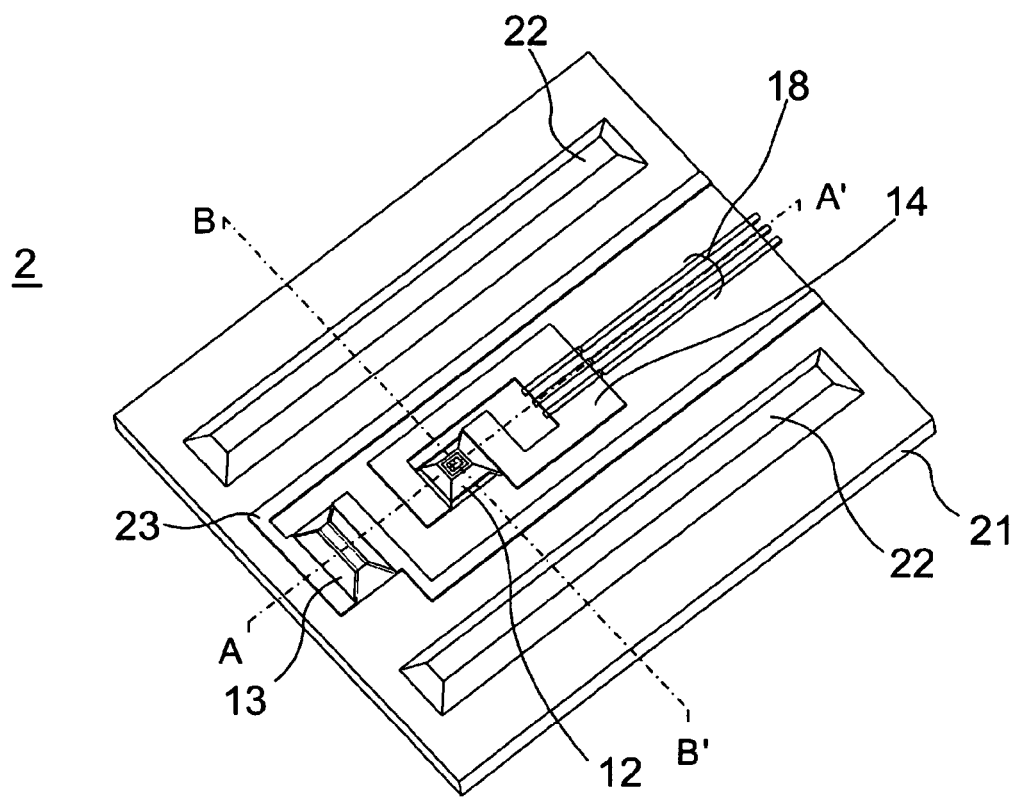
FIG. 3 is a perspective view of a bottom surface of the near field light assisted magnetic recording head according to the first embodiment.

FIG. 3 is a perspective view of the bottom surface of the near field light assisted magnetic recording head 2 according to this embodiment. A substrate 21 formed of quartz glass is formed with the recording element 12, the reproducing element 13, and the magnetic circuit 14 on the surface thereof. Cross-sections of these are shown in FIG. 2. The surface of the substrate 21 includes air floating surfaces 22 and a reproducing magnetic circuit 23 in addition. Although the air floating surface 22 has the shape of a square truncated pyramid rail having a height of 10 μm, a width of 200 μm, and a length of 700 μm, and two such the air floating surfaces 22 are formed on the surface of the substrate 21, this may be designed to be arranged in a square-C shape and also into a tripod shape formed at three positions on the bottom surface.

The recording element 12 is formed into a square truncated pyramid shape having the same height as the air floating surface 22, and the minute structure thereof will be described later in conjunction with FIG. 4. The air floating surfaces 22 receive an air floating force from the disc D by placing the air floating surfaces 22 to oppose a rotating recording medium (not shown). In contrast, a load is applied from the suspension arm 3 to the near field light assisted magnetic recording head 2, and is well balanced with the air floating force, so that the near field light assisted magnetic recording head 2 floats from the surface of the recording medium with a predetermined minute floating amount. The magnetic circuit 14 is formed with a coil 18 so as to extend along part of a periphery of a magnetic film pattern on the substrate 21. The magnetic film pattern is formed of soft magnetic material such as NiFe, NiFeCo, and so on. The coil 18 is formed of Cu.

Figure 4:
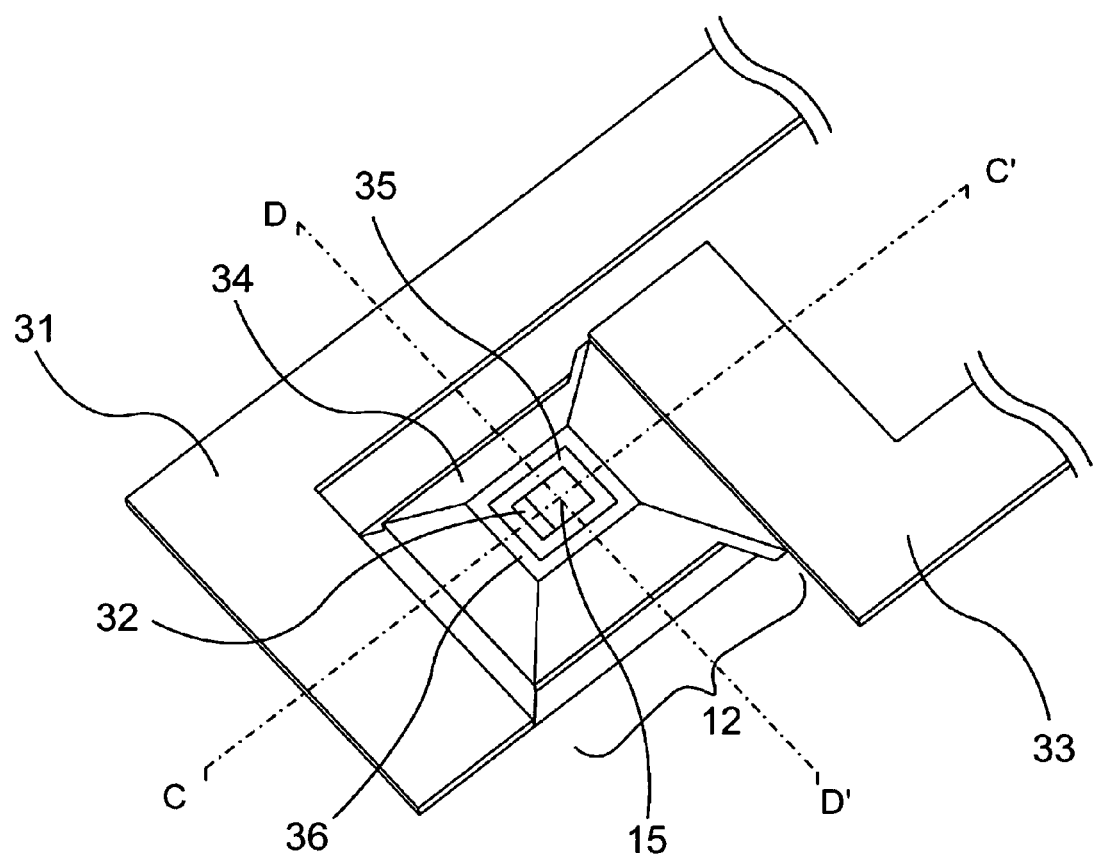
FIG. 4 is an enlarged perspective view near a recording element in FIG. 3.

FIG. 4 is an enlarged perspective view near the recording element 12 in FIG. 3. A main magnetic pole base portion 31 extends from the magnetic circuit 14 in FIG. 3 and appears from above in FIG. 4. A secondary magnetic pole base portion 33 extends from the magnetic circuit 14 also in FIG. 3, and appears from the right in FIG. 4. The main magnetic pole base portion 31 is bent and opposes the secondary magnetic pole base portion 33. The recording element 12 having the square truncated pyramid shape is arranged between them. The main magnetic pole base portion 31 is formed on the side surface on the side of the main magnetic pole base portion 31 (lower left in the drawing) from among four side surfaces of the recording element 12, and serves as a main magnetic pole 32 (first thin film) on an upper surface. The main magnetic pole 32 provides the disc D with the magnetic field substantially in the vertical direction.

A dielectric film 35 is formed on other three side surfaces of the four side surfaces of the recording element 12 and the main magnetic pole base portion 31 on the one side surface described above. In other words, the dielectric film 35 is arranged between the main magnetic pole 32 and a secondary magnetic pole 36, described later, and covers all the four side surfaces.

A secondary magnetic pole side surface portion 34 connected to the secondary magnetic pole base portion 33 is formed on the dielectric film 35, and serves as the secondary magnetic pole 36 on the upper surface. More specifically, the secondary magnetic pole 36 covers the side surface on the opposite side from the side where the main magnetic pole 32 and a tip 41 are arranged from the both surfaces of the dielectric film 35. The secondary magnetic pole 36 absorbs part of the magnetic field given from the main magnetic pole 31. The main magnetic pole 32, the secondary magnetic pole 36, and the dielectric film 35 constitute the magnetic recording element.

In this manner, by the arrangement of the main magnetic pole 32 and the dielectric film 35, the minute gap 15 which generates the near-field light is formed on a tip 41 at the distal end opposing the surface of the disc D.

Figure 5A:
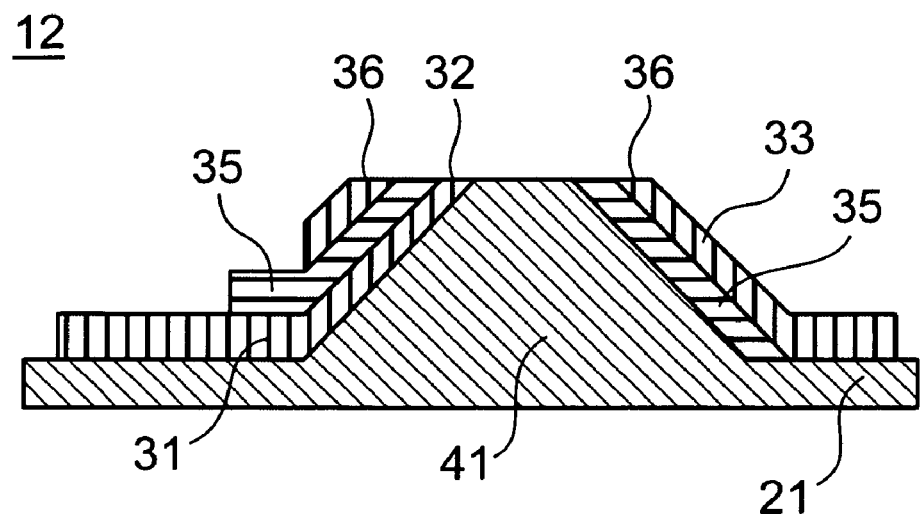
FIG. 5a is a cross-sectional view taken along a line C-C' in FIG. 4.
Figure 5B:
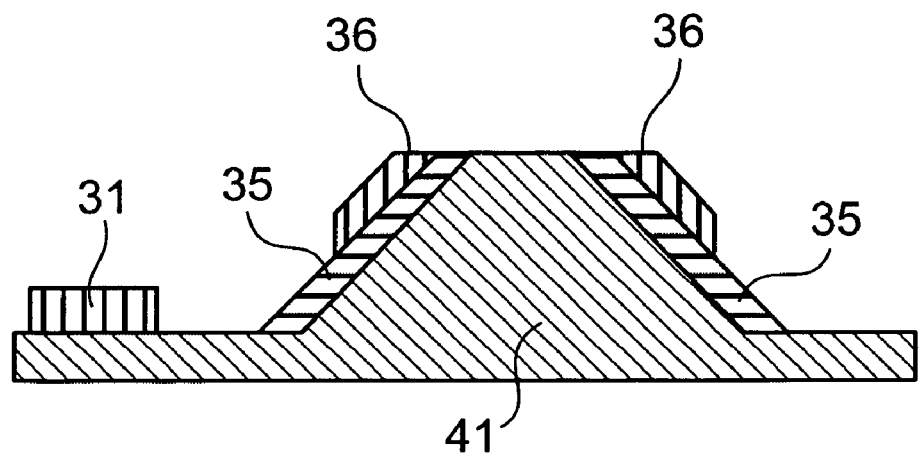
FIG. 5b is a cross-sectional view taken along a line D-D' in FIG. 4.

FIG. 5a and FIG. 5b show cross-sectional views taken along lines C-C' and D-D' in FIG. 4, respectively. The recording element 12 has the tip 41 in which part of the substrate 21 projects in the shape of the square truncated pyramid as a basic structure (conical tip 41). On the two side surfaces shown in FIG. 5a from among the four side surfaces of the tip 41, the main magnetic pole base portion 31 is formed on the left side and the dielectric film 35 is formed on the right side. The main magnetic pole base portion 31 serves as the main magnetic pole 32 at the upper surface of the tip 41. The dielectric film 35 is formed on the main magnetic pole base portion 31. The fact that the dielectric film 35 is also formed on other two side surfaces of the tip 41 is shown in FIG. 5b. The secondary magnetic pole 33 is formed on the dielectric film 35, and serves as the secondary magnetic pole 36 on the upper surface of the tip 41. FIG. 5b shows the fact that the secondary magnetic pole 36 is formed also on the dielectric film 35 on other two side surfaces of the upper surface of the tip 41.

As described above, the main magnetic pole 32, the main magnetic pole base portion 31, the secondary magnetic pole base portion 33, and the secondary magnetic pole 36 are magnetically connected to the magnetic circuit 14, and the coil 18 extends partly along the periphery thereof, so that an electromagnet is configured as a whole. By passing an electric current in the coil 18 in a state of being floated from the surface of the recording medium by the minute floating amount, a magnetic flux is emitted only from the upper surface of the main magnetic pole 32. As described above, the near field light is generated from the minute gap 15 at the distal end of the recording element 12 and, by heating a predetermined area on the surface of the recording medium thereby, a coercive force only in the corresponding area is momentary lowered. Simultaneously, the data is recorded by maintaining or inverting a magnetization of the area of the recording medium by the magnetic flux as described above. The reproducing element 13 is formed in the square truncated pyramid shape as the recording element 12 on the bottom surface of the near field light assisted magnetic recording head 2. The reproducing element 13 is a magnetic resistance element, and outputs the data magnetically recorded on the surface of the medium to the outside as a signal.

According to such features, since the main magnetic pole 32 is arranged on one side of the minute gap 15 where the near field light is generated, the magnetic field may be applied in the minimum heating area on the surface of the medium. Also, since a diagonal component with respect to the surface of the disc from among magnetic flux components generated from the main magnetic pole 32 is absorbed by the secondary magnetic pole 36 arranged in the proximity to the main magnetic pole 32, the magnetic field may be applied only in an extremely localized area on the disc surface, so that the recording head with a high degree of density is achieved.

In other words, improvement of the writing reliability is achieved by restraining the spreading of the near field light and the magnetic field.

Also, since the introduction of the light to the near field light assisted magnetic recording head 2 is achieved by arranging the light guide 4 such as an optical fiber along the suspension arm 3, an extremely low profile light guide structure is achieved. In addition, the component of the magnetic flux emitted from the main magnetic pole 32 proceeding obliquely (the direction which is not vertical to the surface of the recording medium) other than the component proceeding toward a recording area on the surface of the recording medium is absorbed by the secondary magnetic pole 36. Since the secondary magnetic pole 36 is arranged so as to surround the main magnetic pole 32, irrespective of the oblique direction of the component of the magnetic flux proceeding obliquely from the main magnetic pole 32, the oblique magnetic flux component may be absorbed further adequately by the secondary magnetic pole 36. With the near field light assisted magnetic recording head 2 of the structure as, described above, the recording apparatus at the high recording density may be realized in a compact and low profile.

In addition, with the formation of the air floating surfaces 21, the air floating surfaces 22 float above the disc D by the air whirling upward from the disk surface. Therefore, in the distance where the near field light can reach, the near field light assisted magnetic recording head 2 having the air floating surfaces 22 scans at a high speed in the state very close to the disc D, the data may be recorded in the disc D further accurately.

Not only the recording element 12, but also the reproducing element 13 is arranged on the same substrate. Accordingly, the number of components required for arranging the recording element 12 and the reproducing element 13 may be reduced in comparison with the case in which the recording element 12 and the reproducing element 13 are arranged on separate substrates, so that the compact and low-profile recording apparatus 1 may be achieved.

Figure 6:
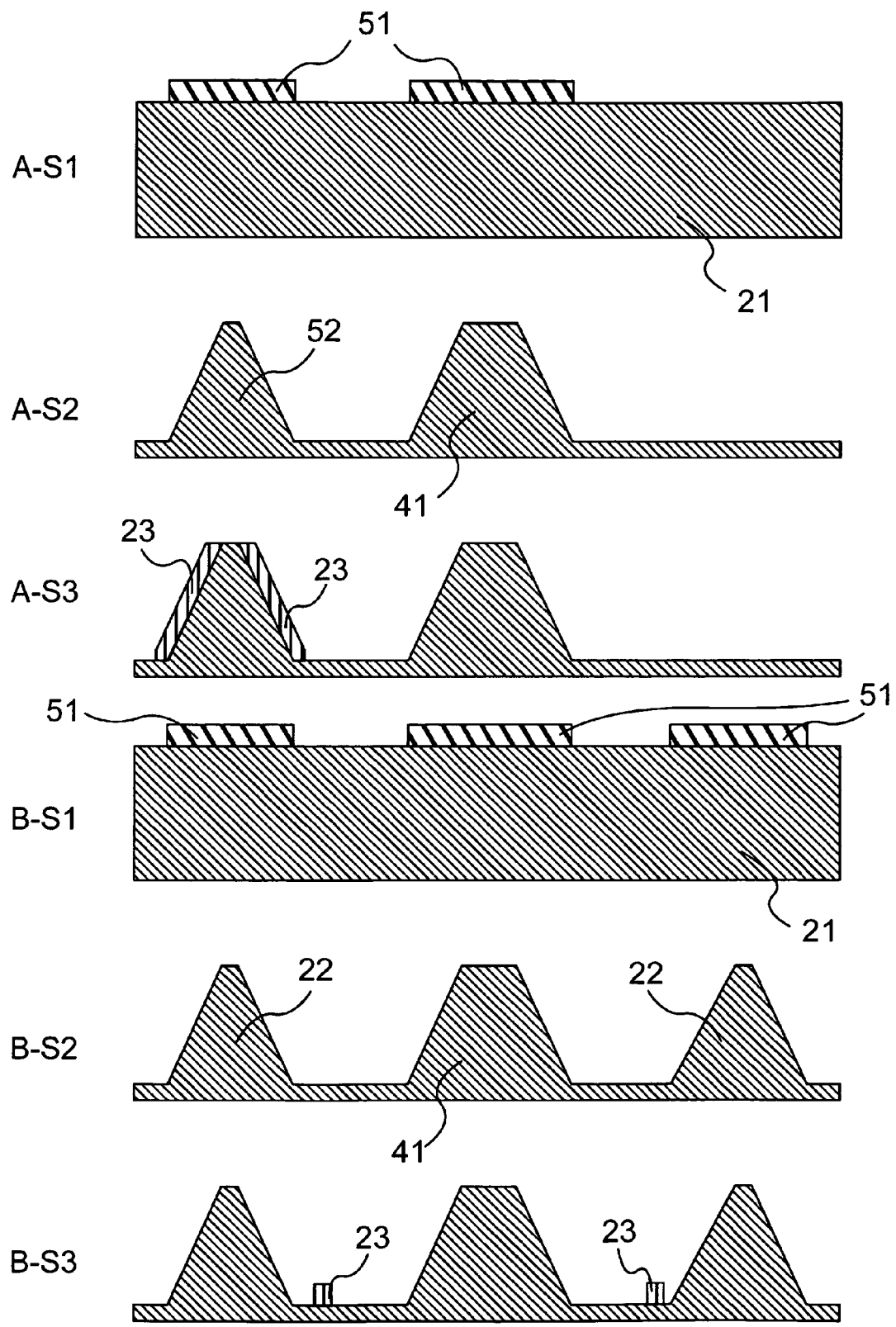
FIG. 6 is a flowchart showing a method of manufacturing the near field light assisted magnetic recording head according to the embodiment.
Figure 7:
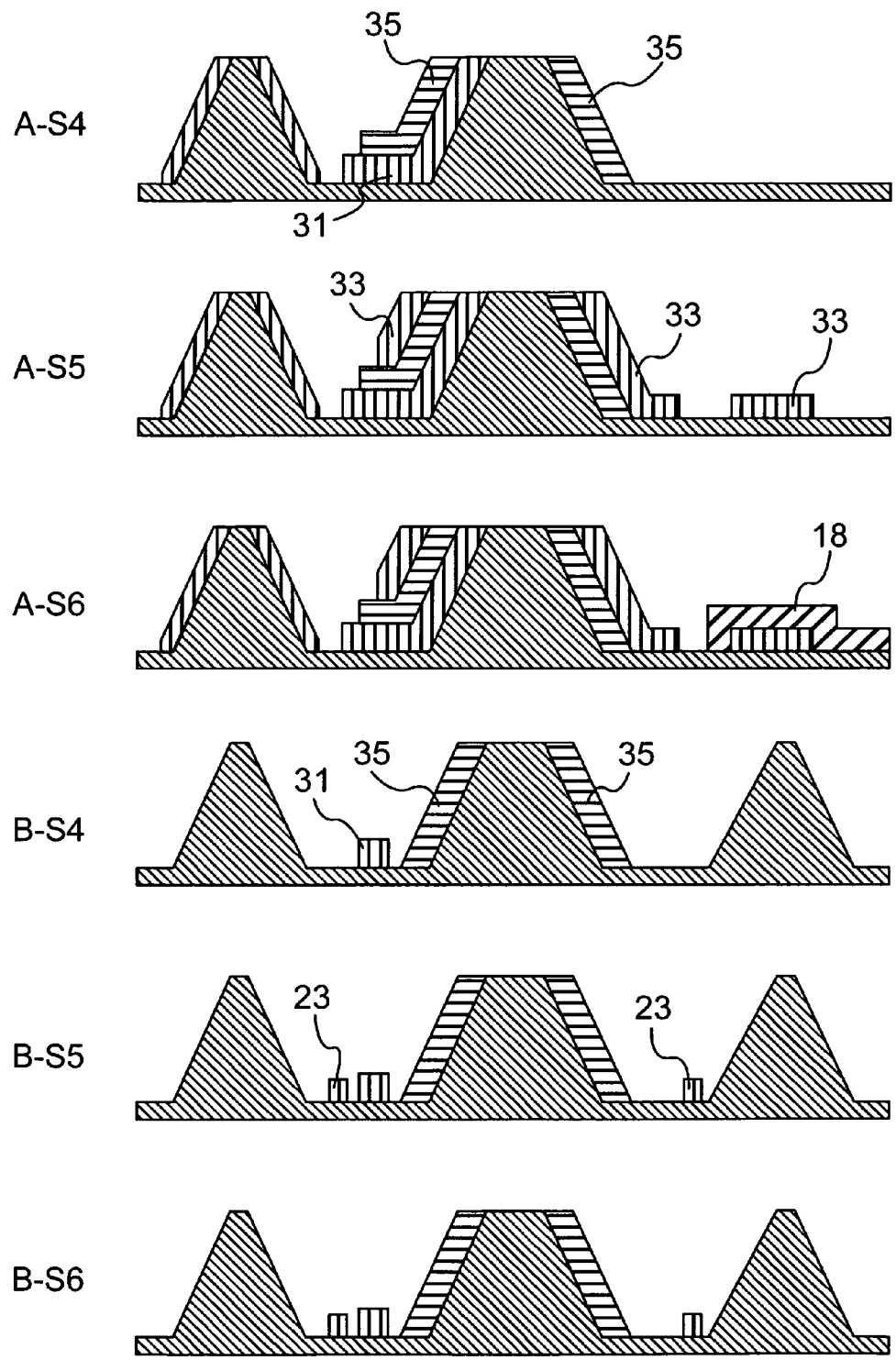
FIG. 7 is a flowchart showing a method of manufacturing the near field light assisted magnetic recording head according to the embodiment.

FIG. 6 and FIG. 7 show a method of manufacturing the near field light assisted magnetic recording head 2 in this embodiment. From A-S1 to A-S6 in FIG. 6 and FIG. 7 show cross-sections taken along a line A-A' in FIG. 3, and from B-S1 to B-S6 show the cross-sections taken along a line B-B' of the same. The cross-section along the line A-A' and the cross-section along the line B-B' both show respective steps of a manufacturing process starting from S1 and ending in S6. In FIG. 6, a resist 51 is patterned on the upper surface of the quartz glass substrate 21 as shown in A-S1 and B-S1. Then, as shown in A-S2 and B-S2, the substrate 21 is etched by isotropic etching to manufacture the truncated square pyramid tip 41, reproducing element base portion tips 52 and the air floating surfaces 22 simultaneously. By etching the same substrate in the same step, the tip 41, the reproducing element base portion tips 52, and the air floating surfaces 22 form an identical plane. Subsequently, as shown in A-S3 and B-S3, the reproducing magnetic circuit 23 for the reproducing element is patterned. It is also possible to form a film on inclined surfaces of the reproducing element base portions tip 52 by rhomble deposition. Subsequently, as shown in A-S4 and B-S4 in FIG. 7, the main magnetic pole base portion 31 is formed on one surface (a left side surface of the tip 41 in A-S4) and a predetermined position on the upper surface of the substrate 21 (shown in B-S4) from among the side surfaces of the tip 41 by deposition. In addition, the dielectric film 35 is formed on all the four side surfaces by spattering. At this time point, the four side surfaces of the tip 41 is formed with the main magnetic pole base portion 31 on the one side surface and the dielectric film 35 on top thereof, and the dielectric film 35 is formed directly on the other three side surfaces. Subsequently, as shown in A-5 and B-S5, the secondary magnetic pole base portion 33 is formed on all the four side surfaces of the tip 41 and a predetermined position on the substrate 21 by deposition. Accordingly, although the secondary magnetic pole base portion 33 covers all the four side surfaces of the tip 41, the main magnetic pole base portion 31 is covered thereby via the dielectric film 35 on one of these side surfaces. Finally, as shown in A-S6 and B-S6, the coil 18 is patterned.

Accordingly, the near field light assisted magnetic recording head according to the present invention may be manufactured by the combination of the normal semiconductor process technologies. This manufacturing method is simple and low cost, and is suitable for mass production.

In this embodiment, the dielectric film 35 covers all the four side surfaces of the tip 41. However, the dielectric film 35 is formed for magnetically isolating the main magnetic pole base portion 31 and the secondary magnetic pole base portion 33, and hence covering all the four side surfaces of the tip 41 is not indispensable, and it is also possible to isolate the secondary magnetic pole base portion 33 by covering only the main magnetic pole base portion 31, for example.

The air floating surfaces 22 are preferably formed to have a height of the air floating surfaces 22 at the same level as or higher than the tip 41. In this case, the distal end of the tip 41 cannot come into contact directly with the surface of the disc D easily because of the fact that the height of the air floating surfaces 22 is the same as or higher than the height of the tip 41, the possibility of breakage of the tip 41 is reduced.

The near field light assisted magnetic recording head 2 (tip 41) may be transparent. The tip 41 formed to be transparent may generate the near field light by the light incoming into the tip 41 from the opposite side from the side where the disc D is arranged from the both sides of the tip 41.

Industrial Applicability

According to such features, since the main magnetic pole is arranged on one side of the minute gap where the near field light is generated, the magnetic field may be applied in the minimum heating area on the surface of the medium.

The invention claimed is:

1. A near-field light assisted magnetic recording head comprising:
   a conical tip having an opening for generating near-field light and a side surface forming at least a part of an edge portion of the conical tip surrounding the opening, the opening being disposed at a distal end of the conical tip configured to oppose a surface of a medium; and
   a magnetic recording element for generating magnetization inversion in a minute area on the surface of the medium which is heated by application of the near-field light, the magnetic recording element having a main magnetic pole comprised of a thin film arranged on side surface of the conical tip for providing a magnetic field to the surface of the medium in a substantially vertical direction, a secondary magnetic pole arranged on a surface of the conical tip opposite to the side surface thereof for absorbing a part of the magnetic field provided from the main magnetic pole, and a dielectric film arranged between the thin film and the secondary magnetic pole.

2. A near-field light assisted magnetic recording head according to claim 1; wherein the dielectric film covers the first thin film and all side surfaces of the conical tip; and wherein the secondary magnetic pole surrounds an entire circumference of the side surface of the conical tip opposite to the side surface thereof on which the thin film is arranged.

3. A near-field light assisted magnetic recording head according to claim 1; wherein the conical tip comprises an etched plane substrate.

4. A near-field light assisted magnetic recording head according to claim 1; further comprising an air floating surface configured to receive an air floating force from the surface of the medium, the air floating surface extending at least to the same height as a height of the conical tip.

5. A near-field light assisted magnetic recording head according to claim 1; further comprising a magnetic resistance element for reproducing data recorded on the surface of the medium, the magnetic resistance element having a conical shape.

6. A near-field light assisted magnetic recording head according to claim 5; further comprising an air floating surface configured to receive an air floating force from the surface of the medium; and wherein the conical tip, the air floating surface, and the magnetic resistance element have the same height.

7. A near-field light assisted magnetic recording head according to claim 3; wherein the plane substrate is transparent; and wherein the conical tip generates the near-field light by a light incoming into the conical tip from a side thereof opposite to the distal end of the conical tip.

8. A recording apparatus comprising: a near-field light assisted magnetic recording head according to claim 1; and a suspension arm for supporting the conical tip of the magnetic recording head so as to oppose a surface of a medium mounted to undergo rotation; wherein the magnetic recording head records data on the medium in a state of the magnetic recording head floating to a predetermined height from the surface of the medium undergoing rotation by a balance between an air floating force from the surface of the rotating medium and a load from the suspension arm supporting the conical tip.

9. A near-field light assisted magnetic recording head according to claim 1; further comprising a substrate having a main surface from which the recording element extends to a predetermined height, and a pair of air floating surfaces extending from the main surface to the predetermined height and arranged so that the recording element is disposed between the air floating surfaces.

10. A near-field light assisted magnetic recording head according to claim 9; further comprising a magnetic resistance element extending from the main surface of the substrate to the predetermined height for reproducing data recorded on the surface of the medium.

11. A magnetic recording head comprising: a pyramid-shaped tip having a minute opening for generating near-field light, the minute opening being disposed at a distal end of the tip configured to confront a surface of a recording medium; and a magnetic recording element for generating magnetization inversion in a minute area on the surface of the recording medium which is heated by application of the near-field light generated by the minute opening of the tip, the magnetic recording element having a main magnetic pole arranged on first surface of the tip for providing a magnetic field to the surface of the medium in a substantially vertical direction, a secondary magnetic pole arranged on a second surface of the tip opposite to the first surface for absorbing a part of the magnetic field from the main magnetic pole, and a dielectric film arranged between the main magnetic pole and the secondary magnetic pole.

12. A magnetic recording head according to claim 11; wherein the first surface of the tip forms at least part of an edge portion of the tip surrounding the minute opening.

13. A magnetic recording head according to claim 11; wherein the tip has a plurality of side surfaces including the first and second surfaces; and wherein the dielectric film covers all of the side surfaces of the tip.

14. A magnetic recording head according to claim 11; wherein tip comprises an etched transparent substrate.

15. A magnetic recording head according to claim 11; further comprising a substrate having a surface from which the tip extends to a predetermined height, and at least one air floating surface extending from the surface of the substrate to the predetermined height for receiving an air floating force generated from the surface of the recording medium.

16. A magnetic recording head according to claim 15; further comprising a magnetic resistance element extending from the surface of the substrate to the predetermined height for reproducing data recorded on the surface of the recording medium.

17. A magnetic recording head according to claim 15; wherein the at least one air floating surface comprises two air floating surfaces arranged on the surface of the substrate so that the tip is disposed therebetween.

18. A recording apparatus comprising:
   a magnetic recording head according to claim 11; and
   a suspension arm for supporting the tip of the magnetic recording head so as to oppose a surface of a recording medium mounted to undergo rotation;
   wherein the magnetic recording head records data on the recording medium in a state in which the magnetic recording head floats to a predetermined height from the surface of the recording medium undergoing rotation by a balance between an air floating force generated from the surface of the rotating recording medium and a load of the suspension arm supporting the tip of the magnetic recording head.

* * * * *